March 17, 1964   G. L. ACKERMAN   3,125,019
JUICE EXTRACTOR

Filed Oct. 26, 1962   4 Sheets-Sheet 1

INVENTOR.
GEORGE L. ACKERMAN
BY
Lieber & Nilles
ATTORNEYS

March 17, 1964  G. L. ACKERMAN  3,125,019
JUICE EXTRACTOR
Filed Oct. 26, 1962  4 Sheets-Sheet 2

INVENTOR.
GEORGE L. ACKERMAN
BY
Lieber & Nilles
ATTORNEYS

March 17, 1964　　G. L. ACKERMAN　　3,125,019
JUICE EXTRACTOR

Filed Oct. 26, 1962　　　　　　　　　　　　4 Sheets-Sheet 3

INVENTOR.
GEORGE L. ACKERMAN
BY
Lieber & Nilles
ATTORNEYS

March 17, 1964 G. L. ACKERMAN 3,125,019
JUICE EXTRACTOR
Filed Oct. 26, 1962 4 Sheets-Sheet 4
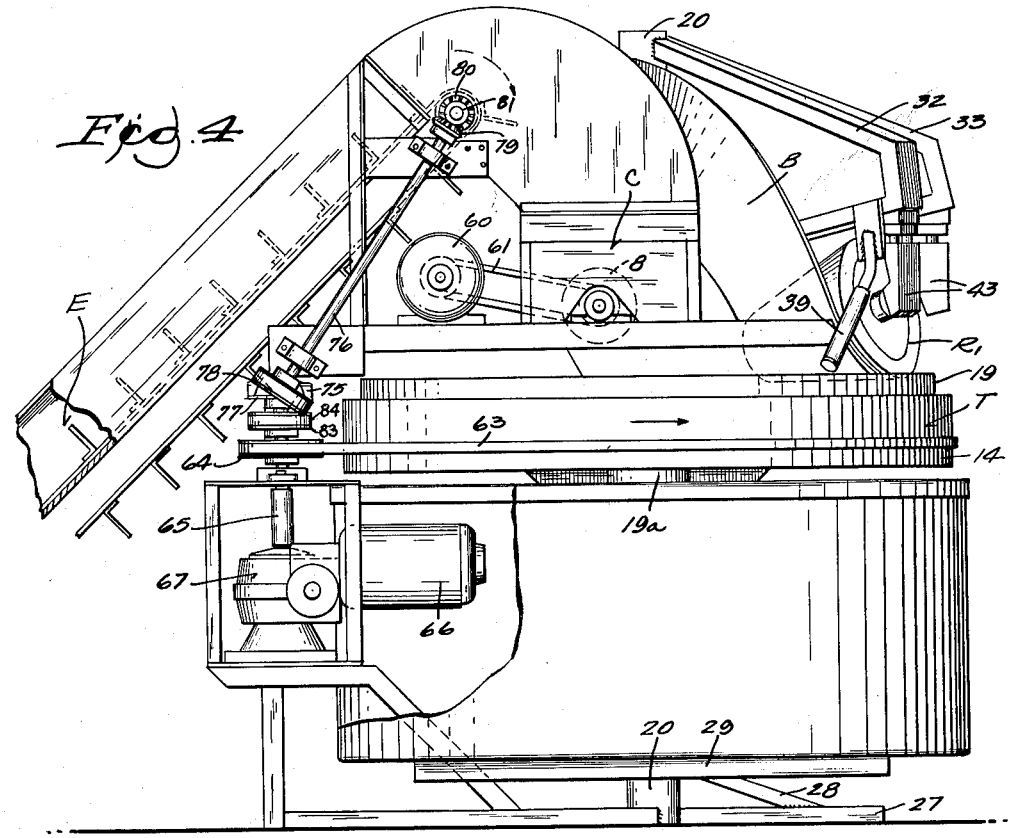
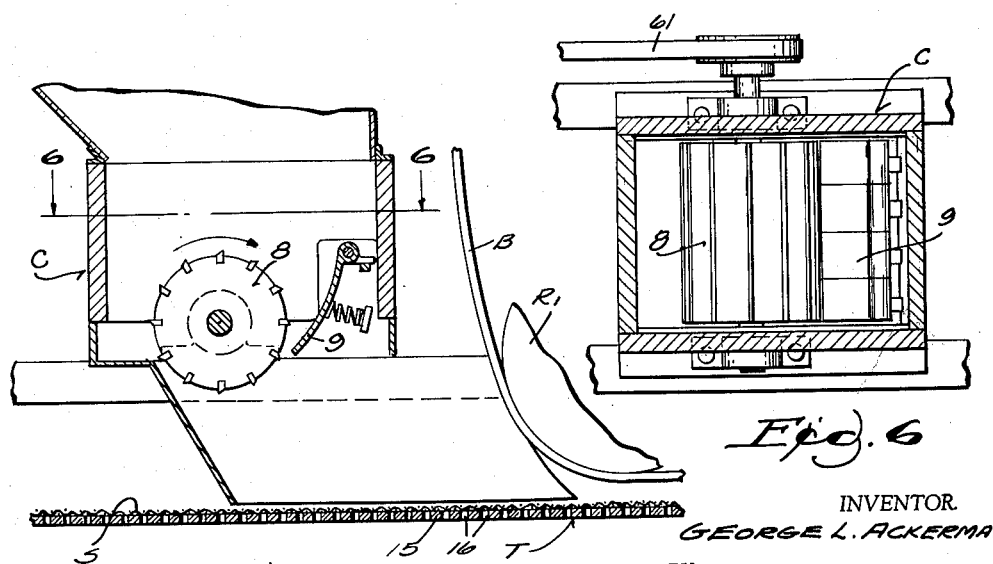
INVENTOR.
GEORGE L. ACKERMAN
BY
Lieber & Nilles
ATTORNEYS United States Patent Office 3,125,019
Patented Mar. 17, 1964

3,125,019
JUICE EXTRACTOR
George L. Ackerman, Rte. 1, Richmond, Ill.
Filed Oct. 26, 1962, Ser. No. 233,218
6 Claims. (Cl. 100—139)

This invention relates to machines for extracting juice from fruit or the like. More particularly, the invention relates to juice extracting apparatus of the general type employing a series of rollers which press the juice containing material against a screen or sieve, thereby forcing the juice from the material and downwardly through the sieve.

Many prior art devices of this general character have been proposed but have not proved to be entirely satisfactory for a number of reasons. For example, the juice that was pressed from the remaining material or "pumice" would not be immediately withdrawn or separated from this pumice and the latter would act to absorb the juice back into the pumice; a considerable portion of the juice was not extracted from the material; excessive power was required to operate a machine with adequate capacity from a commercial standpoint; and much of the juice was wasted by loss due to improperly designed equipment.

Accordingly, it is a general object of the present invention to provide an improved juice extractor machine which overcomes to a great degree the above shortcomings of the prior art.

A more specific object of the present invention is to provide a juice extractor machine utilizing a rotatable screen table against which the material is urged by a series of pressing rollers which are mounted progressively closer to the table in such a manner so as to thereby efficiently and completely remove substantially all the juice from the material. A more limited aspect of the present invention relates to the use of a continuous, flexible and flat belt interposed between the rollers and the screen which serves to considerably enhance the efficiency of the machine by confining the material and also the juice being extracted therefrom.

Still another aspect of the present invention relates to an apparatus of the above type having a definite track or trough in which the said belt and rollers are mounted for efficient cooperation therewith in forcibly and completely removing juice from the material, the arrangement is such that the remaining pumice is forced to assume the shape of a flattened, continuous strip or mat which can be readily removed from the apparatus.

These and other objects and advantages will appear hereinafter as this disclosure progresses, reference being had to the accompanying drawings, in which:

FIGURE 4 is another elevational view, taken generally along line 4—4 in FIGURE 2, but on a reduced scale, certain parts being shown as broken away or in section for clarity;

FIGURE 5 is a fragmentary, sectional view of a portion of the grinder and table as shown in FIGURE 4, but on an enlarged scale;

FIGURE 6 is a plan view, in section, taken along line 6—6 in FIGURE 5;

Figure 1:
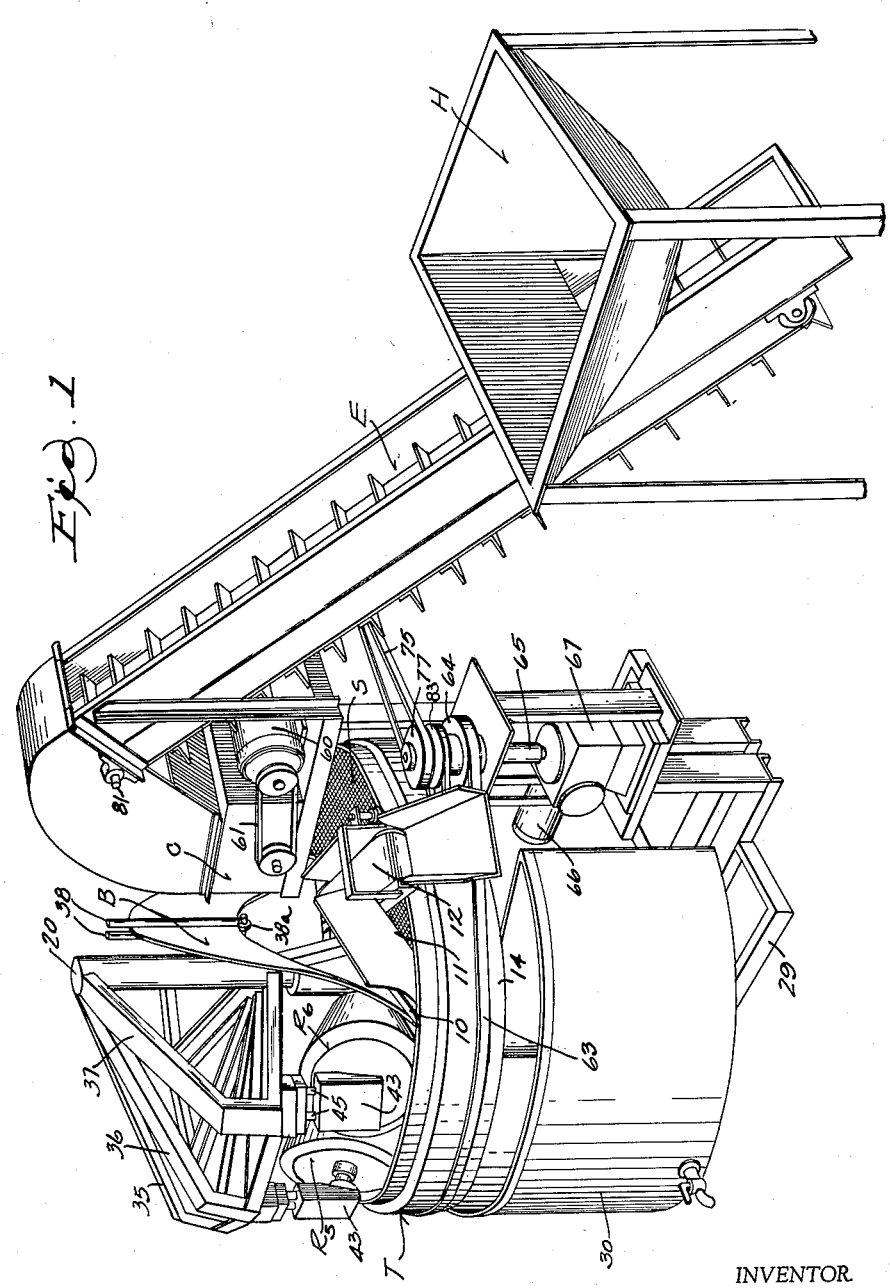
FIGURE 1 is a perspective view of a machine embodying the present invention.

Referring generally to the drawings, the general operation of the machine is as follows. The material, such as apples, are loaded into a hopper H (FIGURE 1) from which they fall into an elevator E for conveyance upwardly and deposit in a conventional crusher C located above the rotatable table T. After the apples have been crushed, they fall onto the screen S located on and forming the upper side of the table. A series of rotatable rollers, designated generally by the letters R, are mounted above the screen and are bodily stationary, that is to say, they do not revolve around the table but are rotatable about their own individual axes.

An endless and flexible, flat belt B is located on the screen and beneath the rollers, and during a portion of its travel around with the table, this belt assumes a vertical path during which it is not in proximity to the table top. The crushed material, as it falls from the crusher, is moved with the table and under the belt at that location where the latter again comes into proximity to the screen top.

As will more fully appear, the rollers are positioned progressively closer to the table top beginning with the first roller R1 and then proceeding in the direction in which the table rotates. Thus, the material is progressively pressed, by means of the belt, more tightly against the screen top as it moves around with the table.

The extracted juice is continuously forced through the screen top and immediately separated from the remaining material known as pumice. The latter is formed into a flat continuous mat M which is subsequently scraped from the screen by a scraper 10, after which it travels up an inclined chute 11 and from which it falls and is deposited in broken up pieces on an endless cross conveyor 12.

*Rotatable Table*

Referring now in greater detail to the drawings for so much of the apparatus and operation that should be more fully described, the table T is comprised of a large, outer cylindrical band 14 having a steel, perforated top 15 which supports the screen S. The perforations 16 of the steel plate top are larger than the mesh of the screen S, and this top 15 acts to furnish a rigid backing for the screen while permitting the extracted juice to drain through the table top.

Perforations of 5/16" diameter on 1/2" centers have proved to be satisfactory for the plate top 15. The screen S is preferably of stainless steel and may be of 80 mesh screen size.

Suitable I-beams 17 extend radially and within the outer steel band 14 and are welded thereto at their outer ends. Around the inner circular edge of the top 15 is welded an angle iron ring 17' which rests on and may also be welded to the I-beams 16.

The inner ends of the I-beams are welded to the vertical sleeve 19a.

Figure 3:
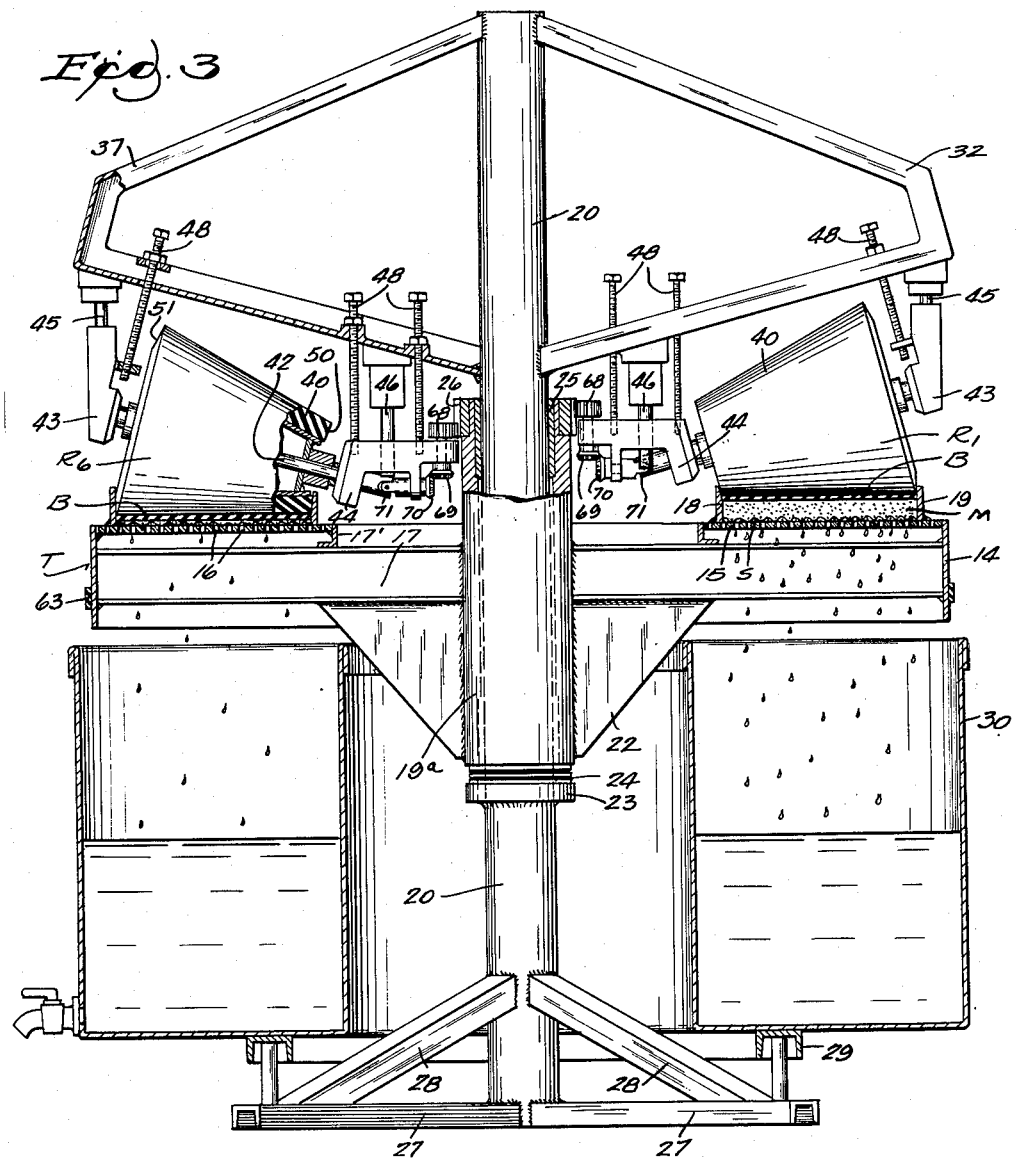
FIGURE 3 is an elevational, sectional view of the machine, taken generally along line 3—3 in FIGURE 2, with certain parts broken away or removed for clarity.

A circular track of generally U-shaped cross section (FIGURE 3) is formed by the circular, vertical walls 18 and 19, and the table top to which they are welded. The inner wall 18 and outer wall 19 are concentrically arranged, and the screen S fits snugly in between them so as to fill the bottom of the track.

This continuous screen may be lifted from the track and be replaced by others of different mesh as the occasion demands.

*Stationary Frame*

The table is rotatably supported on the central post 20 by the sleeve 19a which is reinforced by gussets 22 welded between the sleeve and the I-beams. A thrust collar 23 is welded to the post 20 and a suitable anti-friction bearing assembly 24 is interposed between the lower end of sleeve 19a and the thrust absorbing collar 23. Another bearing 25 is located between the upper, internal end of the sleeve and the post. Secured around and fixed to the external, upper end of the sleeve is a ring gear 26 which drives at least some of the rollers R, as the table itself is rotated, by means to be described.

Thus, a rotatable table is formed by the sleeve 19a, gussets 22, outer band 14, I-beams 17, angle iron 17', top 15, and walls 18 and 19 which are all rigidly secured together and rotate as a unit. The screen S may also be considered part of the table, although it may be removed for cleaning, replacement, or repair.

The central post 20 is suitably supported by radially extending feet 27 and braces 28 welded to the lower end of the post. A support rail 29 may also be secured on the feet for supporting the tank 30 which catches the juice that is forced through the screen and table top. The tank is generally U-shaped, when viewed in plan, so it can be slid underneath the table to embrace or receive the center post 20. The tank extends at least beneath that portion of the track in which juice is extracted, as will appear more fully, and can be slid out from beneath the table to facilitate cleaning or repair thereof.

The stationary frame also includes a spider-like construction fixed at its upper end and which comprises the radially extending and circumferentially spaced braces 32 through 37, inclusive, which are formed of suitable channel iron and welded to the post 20. Each of these stationary braces rotatably support their respective roller R for vertical adjustment relative to the screen S of the table top.

At least one of these rollers should preferably be driven, but any number, including all of them, may be positively rotated, if necessary or desirable. In any event, it is necessary for the peripheral speed of the rollers to be the same as that portion of the table over which they travel, and the same as the belt B which is interposed between the screen S and the rollers.

The Belt

The continuous belt B is preferably formed of neoprene and is of such a width that it completely fills the width of the track.

Figure 2:
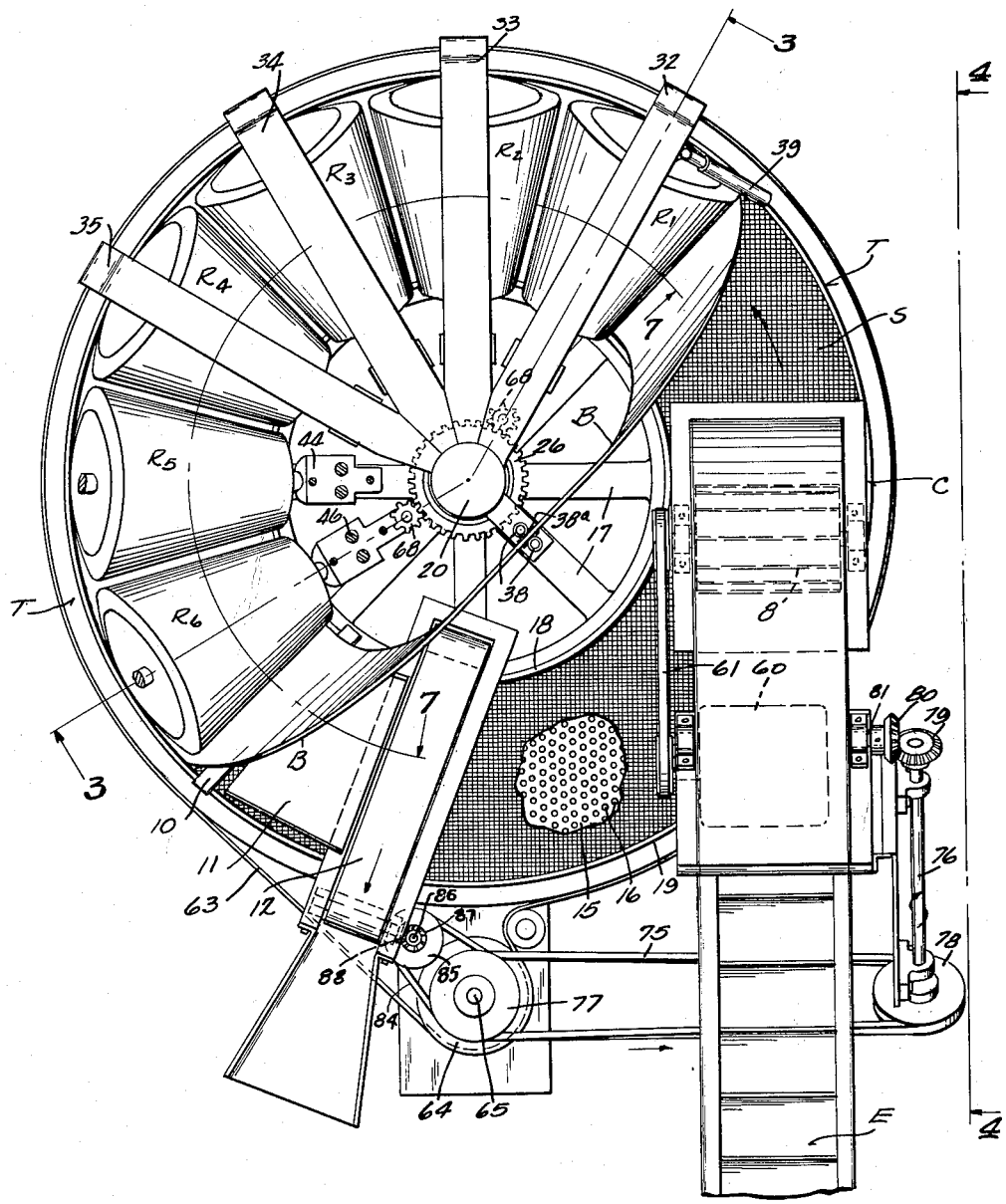
FIGURE 2 is a plan view of the machine shown in FIGURE 1, but on an enlarged scale, and with certain parts in section or broken away for clarity in the drawings.

As shown in FIGURES 1, 2 and 4, the belt is caused to be separated from its position adjacent the screen during a portion of its rotative travel. During this separated portion of the travel of the belt, and just before the belt again approaches the screen, the juice-containing material is deposited on the screen, as indicated in FIGURE 5 from the conventional grinder C.

The grinder includes a cutting wheel 8 which cooperates with a spring-loaded and pivoted plate 9 to grind the material delivered to it by the elevator and then deposit it on the screen.

Figure 7:
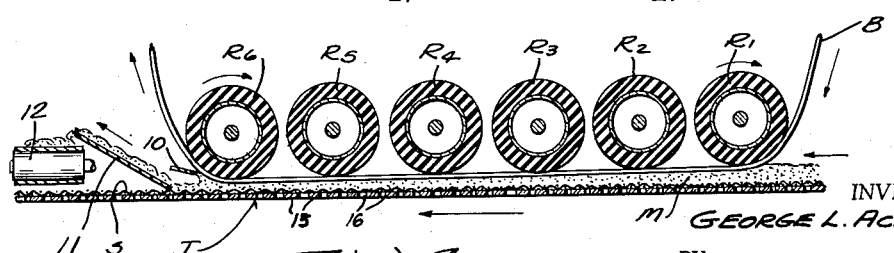
FIGURE 7 is a schematic, cross-sectional view taken generally through all of the rollers and the associated belt and table.

As indicated in FIGURES 1, 2 and 7, as the belt is being separated from the table top area, the scraper 10 acts to peel the mat M from the belt.

Means are provided for guiding and supporting the belt during that portion of its travel in which it is separated from the table top. This means includes a pair of parallel and rotatable rods 38 mounted on the stationary frame and between which the belt passes. A smaller, rotatable roller 38a is mounted crosswise between the rods 38 and the belt rides on this roller and its weight is supported thereby. Another rotatable rod 39 (FIGURE 2) extends from the machine frame and adjacent the first roller R1 to insure proper alignment of the belt, with the track just prior to the entry of the belt into the track.

The Rollers

The rollers R1 through R6 may vary in number and are frusto-conical in shape, having their smaller end toward the center of the table, and are positioned radially with respect to the table top. The lower edges of the rollers are parallel to the screen, as is apparent from FIGURE 3. These rollers are covered with a rather thick layer of resilient material such as rubber 40, for example, thereby providing a resilient periphery for each roller. This resilient material should also be of odorless and tasteless character.

The rollers are fixed to their respective shafts 42 which in turn are suitably journalled in the vertically adjustable bearing blocks 43 and 44 at each end. Vertical guide rods 45 and 46 are fixed to and extend downwardly from the stationary braces 37 and also extend through the bearing block 43 and 44, respectively, to accurately guide the latter in their vertical adjustment. Adjusting bolts 48 are threadably engaged with the block and the braces to effect vertical adjustment of the blocks and the rollers mounted therein. The inner end 50 of the rollers is generally concave or at least is otherwise adapted to bear tightly against the inside of the inner wall 18. The outer end 51 of the rollers is adapted to bear snugly against the inner side of the outer wall. Thus, the rollers are coextensive in length with the width of the track, and this presses the belt B, which is also of the same width as the track, tightly against the screen for the entire width of the latter. This arrangement helps to insure complete juice removal and also permits the juice from squirting out from the areas adjacent the rollers' ends as the rollers act to force the juice directly downwardly through the screen.

As shown in FIGURE 7, the rollers, beginning with the first roller R1, and then continuing in the direction in which the table rotates, are mounted progressively closer to the screen bottom of the track. For example, when extracting juice from apples, for satisfactory operation, roller R1 may be about one inch from the screen, and the successive rollers may be successively ¼" closer to the screen. The last roller R6 may force the belt tightly against the screen and require considerable compression of the resilient periphery of roller R6 in order to permit the compacted mat M to pass therebeneath.

The action of the rollers against the belt is to create a line contact which results in a downward pressure force on the material against the screen. The pressure is released directly below this line of contact which results in controlled squirting of the juice in the intended direction.

Even when extracting juice from the most soft and ripe apples, the squirting is controlled and it is possible to extract and save practically all of the juice.

The action of the rollers is in the nature of rolling of the juice out of the material with comparatively small power requirements. Due to the gradual decrease in distance between successive rollers and the belt, the juice is extracted in an orderly, gradual, and complete manner from the mat of material.

As the last roll is "down tight," there is sufficient "give" in its resilient cover to only permit passage of the mat of pumice.

As the juice is extracted from the material, it is immediately separated from the pumice and it therefore cannot be absorbed by the pumice when the roller pressure is released.

Drive Means

Any suitable means may be utilized for driving the various parts, and the following means are shown only for purposes of illustrating one suitable form.

A separate electric motor 60 is used for driving the grinder C through the endless, flexible belt 61 in the conventional manner.

The table T is rotated by an endless belt 63 wrapped around its periphery and also trained around a pulley 64 secured to the vertical drive shaft 65 which in turn is driven by an electric motor 66 through a gear reduction unit 67.

As previously indicated, the number of rollers which are positively driven is variable, but it is thought preferable to drive only the first and last rollers R1 and R6, while the remaining rollers are driven by the belt.

The rollers R1 and R6 (and any others it may be desirable to drive) are driven from rotation of the table via the ring gear 26, the pinion gear 68, and bevel gears 69 and 70 carried in the bearing blocks 44, and then via the universal connection 71 which connects the bevel gear 70 with the shaft of the rollers. The speed of the rollers is thus synchronized with the table speed.

The elevator E also derives its driving power from vertical drive shaft 65 via the endless belt 75 and power shaft 76 and suitable pulleys 77 and 78. The bevel gears 79 and 80 complete the drive to the upper drive shaft 81 of the elevator.

The cross-conveyor 12 is also driven from the vertical shaft 65 through a pulley 83 fixed thereto (FIGURES 1 and 4), belt 84, a pulley 85 fixed to another vertical shaft 86, and bevel gears 87 and 88.

Various modes of carrying out the invention are contemplated as being within the scope of the following claims particularly pointing out and distinctly claiming the subject matter which I regard as the invention:

1. A juice extractor machine comprising, a rotatably driven table having a circular track on the upper side thereof, said track being U-shape in cross section and including opposite sides and a screen bottom, a plurality of rotatable but bodily stationary tapered rollers in said track and having opposite ends which abut against said track sides, a continuous and flexible belt located between said rollers and screen bottom and of substantially the same width as said track, said rollers having a resilient periphery and their lower edge being parallel with said screen bottom, means for rotatably driving at least one of said rollers in synchronization with said table; said rollers, beginning with one of said rollers and then continuing in the direction in which said table rotates, being mounted progressively closer to said screen bottom, the last of said rollers having its resilient periphery abutting tightly against said belt; and material crushing means located above said track for feeding juice containing material between said belt and said bottom, whereby said material is pressed progressively tighter by the action of successive rollers pressing said belt against said material and consequently the latter against said screen bottom, to thereby extract juice from the material and force said juice through said screen bottom as said table and material rotate beneath said rollers.

2. A machine as defined in claim 1 including means for separating said continuous belt from said track during a portion of its circular travel therewith to permit entry of said material between said belt and track.

3. A juice extractor machine comprising, a rotatably driven table having a circular track on the upper side thereof and in which juice containing material is to be placed, said track being U-shape in cross section and including opposite sides and a screen bottom, a plurality of rotatable but bodily stationary tapered rollers in said track and having opposite ends which abut against said track sides, said rollers having a resilient periphery and their lower edge being parallel with said screen bottom, and a continuous and flexible belt located between said rollers and screen bottom and of substantially the same width as said track, whereby said rollers press said belt against said material and consequently the latter against said screen bottom, to thereby force juice from said material and through said screen bottom as said table and material rotate beneath said rollers.

4. A machine as defined in claim 3 including means for separating said continuous belt from said track during a portion of its circular travel therewith to permit entry of said material between said belt and track.

5. A machine as defined in claim 4, including material crushing means for feeding material between said belt and said screen bottom.

6. A machine as defined in claim 3, including means for positively rotating at least one of said rollers in synchronization with said table.

References Cited in the file of this patent

UNITED STATES PATENTS

| 68,246 | Shinn | Aug 27, 1867 |
| 221,386 | Barnes | Nov. 11, 1879 |
| 223,972 | Ziegler | Jan 27, 1880 |
| 854,588 | Mills | May 21, 1907 |

FOREIGN PATENTS

| 726,728 | Germany | Oct. 19, 1942 |
| 751,757 | Great Britain | July 4, 1956 |